(12) United States Patent
Casaní Montaner et al.

(10) Patent No.: US 10,933,358 B2
(45) Date of Patent: Mar. 2, 2021

(54) SWEEPER AND FILTER ASSEMBLY FOR BEVERAGE PREPARATION MACHINES

(71) Applicant: ZUMEX GROUP, S.A., Valencia (ES)

(72) Inventors: Fernando Casaní Montaner, Valencia (ES); Maximilia Marti Soler, Valencia (ES); Ramón Asensio Camacho, Valencia (ES); Ignacio Ballester Pérez, Valencia (ES); Juan Carlos Coronado Sanz, Barcelona (ES)

(73) Assignee: ZUMEX GROUP, S.A., Valencia (ES)

( * ) Notice: Subject to any disclaimer, the term of this patent is extended or adjusted under 35 U.S.C. 154(b) by 575 days.

(21) Appl. No.: 15/299,727

(22) Filed: Oct. 21, 2016

(65) Prior Publication Data

US 2017/0113168 A1    Apr. 27, 2017

(30) Foreign Application Priority Data

Oct. 22, 2015 (ES) .................................. 201531515

(51) Int. Cl.
| | | |
|---|---|---|
| *B01D 33/44* | (2006.01) | |
| *A47J 31/60* | (2006.01) | |
| *A47J 19/00* | (2006.01) | |
| *A47J 19/02* | (2006.01) | |
| *B01D 33/044* | (2006.01) | |
| *A47J 19/06* | (2006.01) | |
| *A23N 1/02* | (2006.01) | |
| *A23N 1/00* | (2006.01) | |

(52) U.S. Cl.
CPC ............ *B01D 33/044* (2013.01); *A23N 1/00* (2013.01); *A23N 1/02* (2013.01); *A47J 19/00* (2013.01); *A47J 19/02* (2013.01); *A47J 19/06* (2013.01); *A47J 31/60* (2013.01)

(58) Field of Classification Search
CPC ............................. B01D 33/044; A47J 19/06
See application file for complete search history.

(56) References Cited

U.S. PATENT DOCUMENTS

| | | | | |
|---|---|---|---|---|
| 2,034,784 A | * | 7/1943 | Wallny | |
| 2,325,006 A | * | 7/1943 | Crawford | |
| 4,643,826 A | * | 2/1987 | Prunier | ................ B01D 33/042 |
| | | | | 210/225 |
| 4,788,910 A | * | 12/1988 | Tichy | ..................... B30B 9/105 |
| | | | | 100/118 |

(Continued)

FOREIGN PATENT DOCUMENTS

JP         57001600 A    *    1/1982

*Primary Examiner* — Waqaas Ali
(74) *Attorney, Agent, or Firm* — Vedder Price P.C.

(57) ABSTRACT

Sweeper and filter assembly for beverage preparation machines comprising a sweeper associated with a filter, the sweeper comprising a carrier band mounted on at least two shafts. The carrier band can perform the filtering function itself as it is made from a filtering material or is provided with suitable orifices. The carrier band is flexible and preferably elastic. The shafts on which the band is mounted are supported by a casing, where at least one of said shafts engages a drive element comprising a motor and an electronic device for managing the motor. At least one scraper is provided joined to the casing in order to clean the carrier band. The motor of the drive element is independent from the motor of the juicing machine, the device having sweeping and filtering cycles independent of the juicing cycles of the main machine.

6 Claims, 3 Drawing Sheets

(56) References Cited

U.S. PATENT DOCUMENTS

| | | | | |
|---|---|---|---|---|
| 5,456,832 A | * | 10/1995 | Louden | B01D 33/042 100/118 |
| 6,494,167 B1 | * | 12/2002 | Chen | A01K 1/0103 119/479 |
| 2005/0061158 A1 | * | 3/2005 | Della Pietra | A47J 31/3633 99/279 |
| 2011/0129581 A1 | * | 6/2011 | Overton | A47J 31/408 426/431 |

* cited by examiner

SWEEPER AND FILTER ASSEMBLY FOR BEVERAGE PREPARATION MACHINES

As its title indicates the present invention relates to a sweeper and filter assembly for juicing machines that is cleaned automatically, preventing the pulp and fruit remains from clogging the machine and rendering it unusable.

The sweeper proposed moves independently from the juicing machine and is managed independently such that several cleaning programs can be used, regardless of whether or not the machine is in use.

The sweeper is associated with a filter, although in a preferred embodiment the sweeper includes a filtering area achieved by turning the carrier band into a filter by using a filtering band.

The carrier band is flexible, preferably elastic, and is mounted on shafts in the form of a tank tread, where at least one of said shafts is engaged with a drive element.

As described, in the preferred embodiment the carrier band is itself a filter; accordingly, the invention will be explained with reference to this embodiment, without this limiting other embodiments.

The carrier band can filter because it is made from a filtering material, such as textile or mesh, or because it is made from a material in which filtering orifices have been created.

In this way, the juice passes the filtering carrier band while the pulp and fruit remains do not pass through the band and are carried by it to a waste tank.

Auxiliary elements such as scrapers and non-return walls are provided to increase the cleanliness of the sweeper.

The field to which this invention pertains is that of machinery for preparing beverages.

BACKGROUND

Automated juicing systems are known that incorporate a filter, the earliest records of which are the manual cleaning filters found in EP 0594525 or U.S. Pat. No. 5,170,699 among others.

More recently, automated filter cleaning systems have been incorporated.

Spanish utility model U200000308 discloses a filter that incorporates a sweeper comprising a scraper joined to a worm gear parallel to the filter, such that the rotation of the worm gear makes the scraper move. When the scraper reaches the end of its path, the rotation of the worm gear is inverted and the scraper begins cleaning the filter in the opposite direction. In this case, as the scraper must be able to operate in both directions, as is the case with windshield wipers, it must be made from a flexible material that does not function well for pulp stuck in the filter, which requires a greater force.

Spanish Patent P201430311 relates to a juicing machine that incorporates a self-cleaning filter where this filter is fixed, and sweeper scrapers move within it eliminating the pulp and fruit remains. These sweeper scrapers are mounted on two shafts. As in the previous case, the carrying force of the scrapers is limited as they must be made from a flexible material to allow movement about said shafts.

To overcome the aforementioned drawbacks, a self-cleaning sweeper is proposed that preferably comprises a filtering area, wherein the scrapers are fixed and located at a point in the path of the sweeper.

DESCRIPTION OF THE INVENTION

The invention proposed relates to a sweeper associated with a self-cleaning filter for beverage preparation machines that extract fruit juice, said sweeper comprising:

A carrying and filtering area that in turn comprises:
1. A flexible band on which the result of the juicing process falls and is transported.
2. At least two shafts on which the aforementioned band is mounted, in the form of a tank tread, at least one of which is the drive shaft that transmits to the band the movement from a drive element.
3. A casing on which the shafts are supported.
4. At least one scraper.
5. At least one filtering area.

A drive and management element comprising:
1. A motor
2. An electronic device for managing the motor.

The carrying and filtering area are connected to the drive element by a gear that transmits the movement of the motor to the drive shaft supporting the permeable band.

The carrying and filtering area has means for attachment to the beverage preparation machine that allow simple removal thereof for in-depth cleaning.

When the carrying and filtering area is attached to the juicing machine, the motor and drive shaft are engaged, and are disengaged when the filtering area is removed.

The operation and advantages of the device comprising the aforementioned components are explained below.

As stated above, the invention will be explained considering that the carrying band is at the same time a filter itself, although the invention can be executed such that the carrying band only carries the mixture of pulp, seeds and juice obtained after juicing to dump these on another filter or set of filters.

An embodiment where an additional filter is provided although the carrier band is a filter is also not discarded.

In view of the above, the invention can be explained as follows.

The carrier band, which is flexible, receives on its upper surface the product of the juicing, that is, the fruit juice and the solid remains such as pulp or seeds, among others.

The juice crosses the carrier band, which is permeable, and the solid remains are caught on the surface thereof and carried by the carrier band towards the waste container.

A permeable band is understood to be one that allows liquid to pass through it, either because it is made from a permeable material such as fabric or mesh among others, or because it has orifices in the form of a filter.

Since the band is continuous and acts as a tank tread with an upper part and a lower return part, the juice must cross the band twice before falling into the container, thereby improving the filtering results.

Regardless of the above, additional filters may be added for refining the juice as stated above.

The band is preferably made from an elastic material to facilitate assembly and removal operations and to maintain tension, preventing sagging.

If there is sagging it may be necessary to use a tensioning element, such as a third shaft, which would complicate the assembly and removal operations such that this solution is not considered to be commercially interesting.

The shafts on which the band is mounted are present at the ends of the latter's path and mounted on the casing that also acts as a bearing.

The shafts can be easily removed from the casing using any geometric design complementing the joining elements thereof.

One of the shafts is placed higher than the other, such that the band is not level, with one of its ends higher than the other.

In general in normal filtering operations the band will move upward, thereby partially counteracting the pull of gravity and allowing the juice and pulp mixture to remain a longer time on the filtering band and therefore achieve better draining and a greater amount of juice.

The direction of motion can be reversed for other operations.

A scraper is attached to the casing meant to eliminate pulp remains from the surface of the latter.

Said scraper is preferably placed at a lower height, after the rotation of the carrier band about one of the shafts. In this way most of the pulp, seeds and remains fall by gravity when the band turns downward to start its return motion. However, the remains that continue to be adhered to the band collide with the scraper and also fall into the waste container.

The scraper can be placed at the upper part, but tests conducted do not show good performance.

In addition there can be a second or third scraper placed at a later point in the path.

The drive element of the device comprises a motor and a management element, such that several programs of use can be employed depending on the type of juicing or cleaning desired and the type of fruit to be squeezed; the sweeper working cycles provide examples of this:

Keeping the carrier band in motion for a time after the juicing ends, enhancing the cleaning thereof.

Using the carrier band by loads, keeping it still for some time during juicing extending the drainage time so that, at a later time, it is moved forward enough for the new material of the juicing (juice, pulp or seeds) to fall on a clean area.

Inverting the direction of motion to press against an anti-return wall provided on the casing.

As stated above, the motor associated with the sweeper is independent of the motor of the juicing machine, such that a movement of the carrier band is allowed that does not have to be linked to the movement of the juicing machine.

Figure 1:
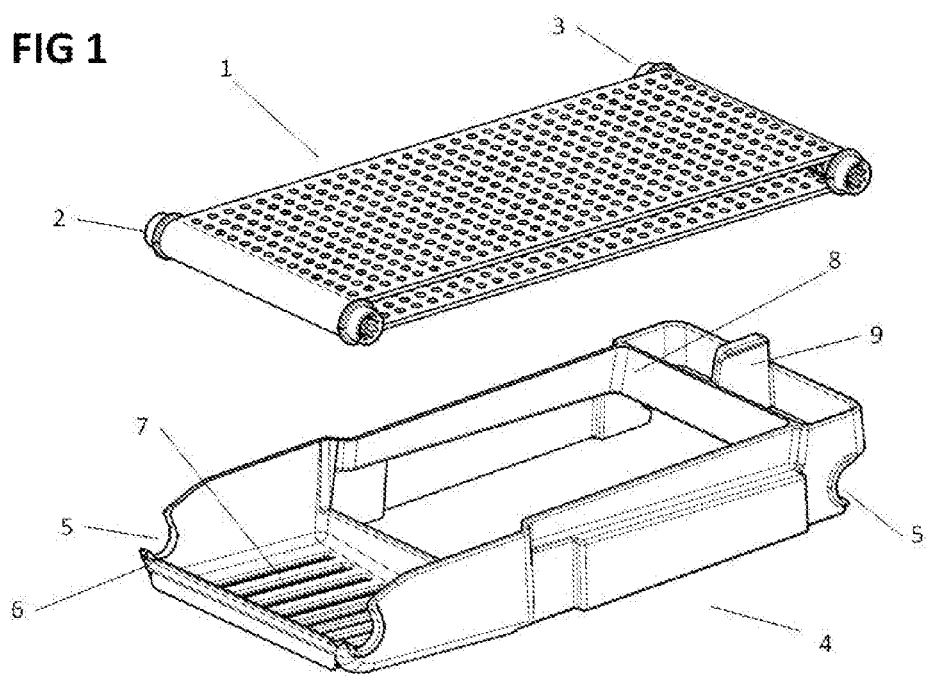
FIG. 1 shows an exploded view of the carrier band (1) in this case perforated to act as a filter, the shafts (2) and (3) on which said band is mounted, the casing (4) that supports the carrier band and the shafts, where the shafts are housed in bearings (5) provided on the casing itself, and also shows the main scraper (6), the additional filter (7), the non-return wall (8) and a handle (9) that allows stiffening the assembly and facilitates handling the casing.
Figure 2:
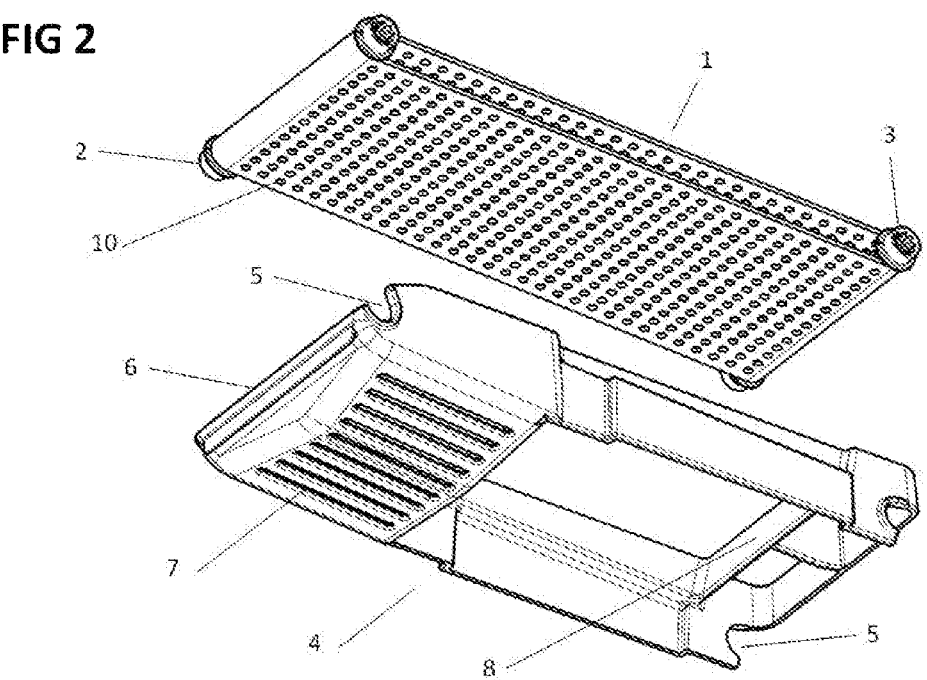
FIG. 2 also shows an exploded view, in this case from a lower perspective, of the carrier band (1) showing its bottom face (10), the shafts (2) and (3) and the casing (4) with the bearings (5) provided on the casing, as well as showing the main scraper (6), the additional filter (7) and the non-return wall (8).
Figure 3:
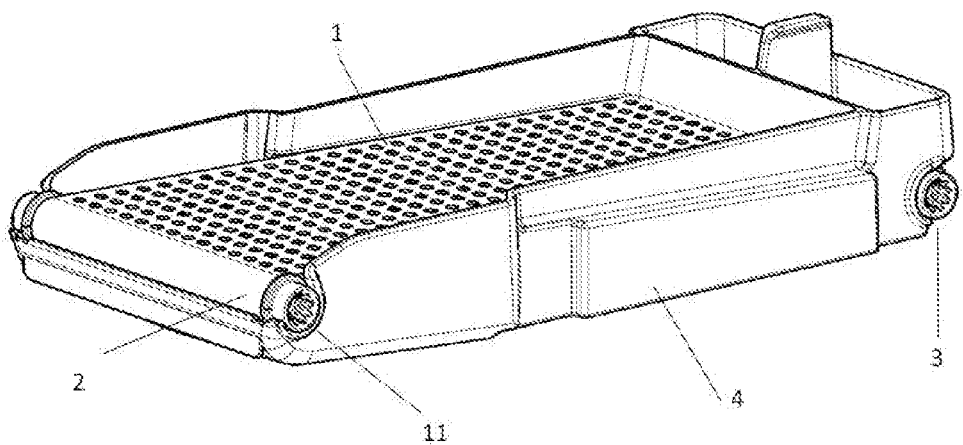
FIG. 3 shows the mounted assembly formed by the carrier band (1) and the casing (4), with the shafts (2) and (3) at the ends of the shafts (2) and (3) resting on the bearings and also at the ends of the shafts a gear (11).

The motor and the management device have not been represented as these elements are easily understood without the need for explanatory drawings.

DESCRIPTION OF A PREFERRED EMBODIMENT OF THE INVENTION

An embodiment of the invention is described herein by way of illustration that is not meant to be unique or to limit the scope of the invention.

The invention, a filter and sweeper assembly for juicing machines, comprises two clearly differentiated areas related to each other.

A carrier and filtering area that comprises:

A flexible and permeable band (1) made from an elastic material having a plurality of perforations.

Two shafts (2) and (3) on which the flexible band is mounted in the form of a tank tread and which limit the path thereof, one of the shafts placed at a greater height than the other such that the flexible band is inclined.

A casing (4) that supports the shafts.

Attached to this casing is a main scraper (6), an additional filter (7), an anti-return wall (8) and a handle (9).

The shafts (2) and (3) have at their ends a gear (11) meant to engage the rotation shaft of the motor such that, when connected, the rotation of the motor is transmitted to the shaft and therefore to the carrier band.

The juice with the pulp and seeds falls on the carrier band; the juice passes through its orifices while the pulp, seeds and other remains are carried toward the end of the carrier band and fall into the waste container.

If any remains continue to be adhered to the carrier band and do not fall by gravity, a scraper (6) is provided to remove them.

For greater effectiveness, an additional filter (7) is provided on the bottom part of the casing.

The second area of the device, not shown in the drawings, comprises the motor and management electronics for the motor, both located internally to the juicing machine, away from the filtering area to avoid contact with the juice.

The motor engages gears that transmit the motion to one of the shafts (2) or (3) and thereby to the carrier band (1), preferably by friction, although other means for transmitting the motion are not discarded.

The electronic management of the motor allows several filter cleaning programs, such that the movements of the filtering area can coincide with those of the juicing elements of the juicing machine to clean the latter as it is used, and also allows cleaning programs independent of the movement of the juicing machine.

The invention claimed is:

1. SWEEPER AND FILTER ASSEMBLY FOR A BEVERAGE PREPARATION MACHINE comprising:
    a flexible carrier band, wherein the band is permeable;
    a pair of shafts about which said band is mounted in a continuous tank tread configuration so as to define an upper part of the band and a lower part of the band, wherein the band is configured to carry and filter a product of beverage preparation and the upper part of the band is disposed to catch the product of beverage preparation; and
    a casing disposed within the beverage preparation machine, wherein the shafts, with the mounted band, are removably connected to the casing such that the band is under tension, and wherein the casing further comprises:
    a main scraper disposed adjacent one of the shafts;
    a non-return wall disposed adjacent one of the shafts opposite the main scraper; and
    a secondary filter is formed in a bottom part of the casing adjacent the main scraper, wherein at least one of the shafts is configured to couple to a drive element disposed in the beverage preparation machine comprising a motor and an electronic device for managing the motor,
    wherein the casing, together with the shafts, mounted band, main scraper, and secondary filter disposed within the casing, is removably connected to the beverage preparation machine.

2. SWEEPER AND FILTER ASSEMBLY FOR BEVERAGE PREPARATION MACHINES according to claim 1 wherein the flexible carrier band is made from an elastic material.

3. SWEEPER AND FILTER ASSEMBLY FOR BEVERAGE PREPARATION MACHINES according to claim 1 wherein the flexible carrier band is made from a permeable material so as to function as a filter.

4. SWEEPER AND FILTER ASSEMBLY FOR BEVERAGE PREPARATION MACHINES according to claim 1 wherein the flexible carrier band has perforations so as to function as a filter.

5. SWEEPER AND FILTER ASSEMBLY FOR BEVERAGE PREPARATION MACHINES according to claim 1 wherein the upper part of the flexible carrier band is inclined and the band moves in an upward direction.

6. SWEEPER AND FILTER ASSEMBLY FOR BEVERAGE PREPARATION MACHINES according to claim 1 wherein the drive element is separated from a filtering area.

\* \* \* \* \*